(12) United States Patent
Currie (10) Patent No.: US 10,070,720 B2
(45) Date of Patent: Sep. 11, 2018

(54) VARIABLE-SUPPORT-POINT SPAN-ALIGNED-GRID FRAMING SYSTEM

(71) Applicant: Jason Currie, Santa Barbara, CA (US)

(72) Inventor: Jason Currie, Santa Barbara, CA (US)

( * ) Notice: Subject to any disclaimer, the term of this patent is extended or adjusted under 35 U.S.C. 154(b) by 12 days.

(21) Appl. No.: 15/285,457

(22) Filed: Oct. 4, 2016

(65) Prior Publication Data

US 2018/0092459 A1 Apr. 5, 2018

(51) Int. Cl.
| | | |
|---|---|---|
| *A47B 47/04* | (2006.01) | |
| *A47B 47/00* | (2006.01) | |
| *A47B 57/10* | (2006.01) | |

(52) U.S. Cl.
CPC ........ *A47B 47/042* (2013.01); *A47B 47/0075* (2013.01); *A47B 47/0091* (2013.01); *A47B 57/10* (2013.01); *A47B 2230/0092* (2013.01)

(58) Field of Classification Search
CPC ........ A47F 5/10; A47F 5/0018; A47F 5/0025; A47F 5/0043; A47F 5/101; A47F 5/11; A47F 5/112; A47F 5/116; A47B 47/0075; A47B 57/10; A47B 2220/0083; A47B 2230/0092; A47B 47/042; A47B 47/00; A47B 87/0246; A47B 2230/0085; A47B 81/068; A47B 47/0091; A47B 47/04; A47B 47/025; A47B 47/066; A47B 47/0058; A47B 87/00; A47B 87/007; A47B 96/00; A47B 96/02; A47B 96/04; A47B 96/145

USPC ......... 211/153, 134, 188, 118, 186; 108/92, 108/101, 110, 158.12, 180, 186, 91; 312/111, 107
See application file for complete search history.

(56) References Cited

U.S. PATENT DOCUMENTS

| | | | | |
|---|---|---|---|---|
| 1,681,218 | A * | 8/1928 | Carlson ................. | A47B 57/10 108/110 |
| 2,366,677 | A * | 1/1945 | Rosenthal ............. | A47B 47/042 108/180 |
| 3,464,565 | A * | 9/1969 | Nevai ..................... | A47B 65/00 211/186 |
| 3,788,241 | A * | 1/1974 | Ravreby ................. | A47F 7/08 108/158.12 |
| 4,562,776 | A * | 1/1986 | Miranda ............... | A47B 47/042 108/158.12 |
| 4,949,853 | A * | 8/1990 | Klein ..................... | A47B 47/02 108/180 |
| 5,117,989 | A * | 6/1992 | Ross ...................... | A47B 47/04 108/180 |

(Continued)

*Primary Examiner* — Hiwot E Tefera (57) ABSTRACT

A novel framing system where the horizontal members are formed in a span-aligned-grid consisting of a series of ribs and openings, providing variable-support-points for the vertical members, so that within a given assembly the vertical members may be positioned and repositioned at a multitude of available variable-support-points, in a plurality of usable positions and angle orientations in the horizontal directions of left-to-right and forward-to-back, creating customizable framed opening bays, and that the vertical members are guided to interlock with the horizontal members at a multitude of available predetermined positions, which intersect along spans at variable-support-point locations, as guided by said span-aligned-grid.

The novel framing system produces a novel design, where the horizontal members are formed with a slatted patterned surface decoration, which is visually evident of the given configuration of said span-aligned-grid.

4 Claims, 8 Drawing Sheets

(56) References Cited

U.S. PATENT DOCUMENTS

| | | | | |
|---|---|---|---|---|
| 5,579,702 A * | 12/1996 | Aho | A47B 87/008 |
| | | | | 108/91 |
| 5,718,343 A * | 2/1998 | Belokin | A47B 47/00 |
| | | | | 211/118 |
| 6,615,999 B1 * | 9/2003 | Culp | A47B 47/042 |
| | | | | 211/184 |
| 7,856,772 B1 * | 12/2010 | Culp | A47B 47/047 |
| | | | | 211/186 |
| 8,763,539 B2 * | 7/2014 | Odar Pena | A47B 19/002 |
| | | | | 108/12 |
| 9,370,243 B2 * | 6/2016 | Menard | A47B 47/042 |
| 2007/0022919 A1 * | 2/2007 | Moore, Jr. | B65D 19/0059 |
| | | | | 108/57.25 |
| 2009/0107939 A1 * | 4/2009 | Liao | A47F 5/10 |
| | | | | 211/134 |
| 2009/0223915 A1 * | 9/2009 | Thompson | A47B 49/004 |
| | | | | 211/85.3 |
| 2009/0242501 A1 * | 10/2009 | Yankello | A47B 87/0246 |
| | | | | 211/153 |
| 2009/0309464 A1 * | 12/2009 | Schwartz | A47B 47/0033 |
| | | | | 312/111 |
| 2012/0080910 A1 * | 4/2012 | Davis | A47B 47/0075 |
| | | | | 297/118 |
| 2012/0118843 A1 * | 5/2012 | MacLean, III | A47B 47/0075 |
| | | | | 211/144 |
| 2012/0152876 A1 * | 6/2012 | Stroud | A47B 47/042 |
| | | | | 211/153 |
| 2014/0263138 A1 * | 9/2014 | Koch | A47B 47/0075 |
| | | | | 211/195 |
| 2015/0265047 A1 * | 9/2015 | Menard | A47B 47/042 |
| | | | | 211/186 |

* cited by examiner

VARIABLE-SUPPORT-POINT SPAN-ALIGNED-GRID FRAMING SYSTEM

BACKGROUND

This invention relates generally to a variable framing system, which can produce a variety of configurations. The assembly allows for vertical members to be placed in a variety of locations, providing a customizable arrangement of the framed opening bays. The system is structurally stable to gravity and lateral loading, and may find use in the fields of storage systems, furniture, or other framing systems.

This invention relates to USPTO Class 108, Horizontally supported Planer Surfaces, including: subclass 156 devices comprising independent legs sustaining a surface in operative position by a direct connection, subclass 158.12 devices including a connection means having parts adapted to exactly fit and lock into each other, subclass 184 devices in which the surface is made from materials capable of transmitting light so that an object can be seen through it, subclass 187 devices wherein the support structure includes at least two legs and an elongated horizontal member connected to them and extending between them.

This invention also relates to USPTO Class 211, Supports: Racks, including: subclass 153 devices consisting of shelves, subclass 186 devices wherein built-in open framework for supporting a shelf is readily assembled to form a shelf support, and disassembled to a form that is not so usable, without the use of tools.

This invention also relates more broadly to USPTO Class D06, Furnishings, including: design for articles with open storage areas, designs with superposed repeating shelve surfaces, and designs with segmented, slatted, or patterned tops.

This invention provides a novel framing system with a method for repositioning the vertical supports in a plurality of usable positions and angle orientations in the horizontal directions of left-to-right and forward-to-back, allowing a customization of the framed opening bays of the shelves.

The novel framing system method that this invention uses to achieve said repositioning of the vertical supports in a plurality of usable positions and angle orientations in the horizontal directions, produces a novel design, where the horizontal members are formed with a slatted patterned surface, which is visually evident of the given configuration of said framing system.

BRIEF SUMMARY OF THE INVENTION

A novel framing system where the horizontal members are formed in a span-aligned-grid consisting of a series of ribs and openings, providing variable-support-points for the vertical members, so that within a given assembly the vertical members may be positioned and repositioned at a multitude of available variable-support-points, in a plurality of usable positions and angle orientations in the horizontal directions of left-to-right and forward-to-back, creating customizable framed opening bays, and that the vertical members are guided to interlock with the horizontal members at a multitude of available predetermined positions, which intersect along spans at variable-support-point locations, as guided by said span-aligned-grid.

The novel framing system produces a novel design, where the horizontal members are formed with a slatted patterned surface decoration, which is visually evident of the given configuration of said span-aligned-grid.

The framing system is comprised of two types of components; the horizontal members, and the vertical members.

The horizontal members are formed with a series of alternating openings and ribs organized in a span-aligned-grid pattern. The series of openings and ribs provide a lightweight, efficient, and variable-support-point load bearing system. The horizontal members are thus formed with a slatted patterned surface, and this formal design element is a decorative manifestation of the given configuration of said span-aligned-grid framing system. The openings in the horizontal member also allow light to pass through the structure.

The vertical members are formed to fit slidably into the openings of the horizontal members, and may be located within a plurality of available openings, and aligned to a multitude of available variable-support-points as guided by the span-aligned-grid. This allows the assembly to be arranged with the vertical members in various customizable locations, creating a corresponding customization of the framed bays. The vertical members may be positioned and repositioned in a plurality of available positions and angle orientations within the assembly in the horizontal directions of left-to-right and forward-to-back.

The vertical members fit slidably into the openings of the horizontal members, and the horizontal members fit slidably into the slots of the vertical members, so that these two components interlock to form an assembly requiring no use of tools or fasteners.

A given assembly of horizontal members and vertical members may be assembled, disassembled in a knockdown format to be compactly packed and stored, and reassembled in a verity of configurations. Individual vertical members may be positioned, removed, and repositioned in a given assembly without disassembling the entire assembly.

The span-aligned-grid is characterized by a regularly spaced grid, with three-way directionality, comprised of a series of alternating openings and ribs with the following parameters.

The ribs are configured to form simple spans, corresponding to the layout of the three-way grid, with one primary and two secondary directions. Primary span ribs are continuous across the assembly, and aligned so that their longitudinal axis is parallel to the one primary direction of the three-way grid. Secondary span ribs are continuous between primary span ribs, and aligned so that the longitudinal axis of each one of the secondary span rib is parallel to one of the two secondary directions of the three-way grid.

The openings are regularly sized, with a profile shape corresponding to the cross section of the vertical members, in such a way that the vertical member can pass slidably through the openings. The alignment of the openings and ribs are organized so that the longitudinal axis of the opening is parallel to the longitudinal axis of the secondary span ribs, and so that the longitudinal axis of the openings are aligned to intersect with a primary span rib at a support point.

The longitudinal axis of the openings are parallel to the two secondary directions of the three-way grid, so that the angle of orientation of the vertical members may be aligned to either of the two secondary directions of the three-way grid too, to provide out-of-plane bi-directional lateral bracing.

The components are planar and have a thickness sufficient to be self-supporting, given the material of the construction employed. The openings in the horizontal members have a width that corresponds the thickness of the vertical members, so that when the components are interlocked they fit snuggly, and bare the weight of the assembly, and whatever additional loads they are engineered to carry.

The horizontal member and vertical member components may be engineered to carry the loads of, and may be constructed out of, a variety of desired materials. The preferred embodiment employs horizontal members and vertical members formed from ply-wood, produced by cutting out the shapes with a CNC router or other similar woodworking machinery. This material is readily available, and those of skill in the art are familiar with working with such material. Other materials are available that would be suitable for alternative embodiments of the subject matter of the disclosure. Examples are metallic materials such as aluminum or any other similar materials, plastic materials, or cementitious materials. Those in the art will understand that in any suitable material, now known or hereafter developed, may be used in forming the components described herein.

The terms horizontal and vertical are used herein to describe in a functional sense general orientations of the components. The preferred embodiment employs components with horizontal and vertical configurations which are true and flat. Components that deviate from the true and flat horizontal and vertical orientations would also be suitable for alternative embodiments of the subject matter of the disclosure.

Further disclosure related to the invention is provided in the description that follows. The invention is not limited however to any particular preferred embodiments described, and various modifications and alternate embodiments such as would occur to one skilled in the art to which this invention relates, are also contemplated and included within the scope of the invention described herein.

DETAILED DESCRIPTION AND BEST MODE OF IMPLEMENTATION

Figure 1A:
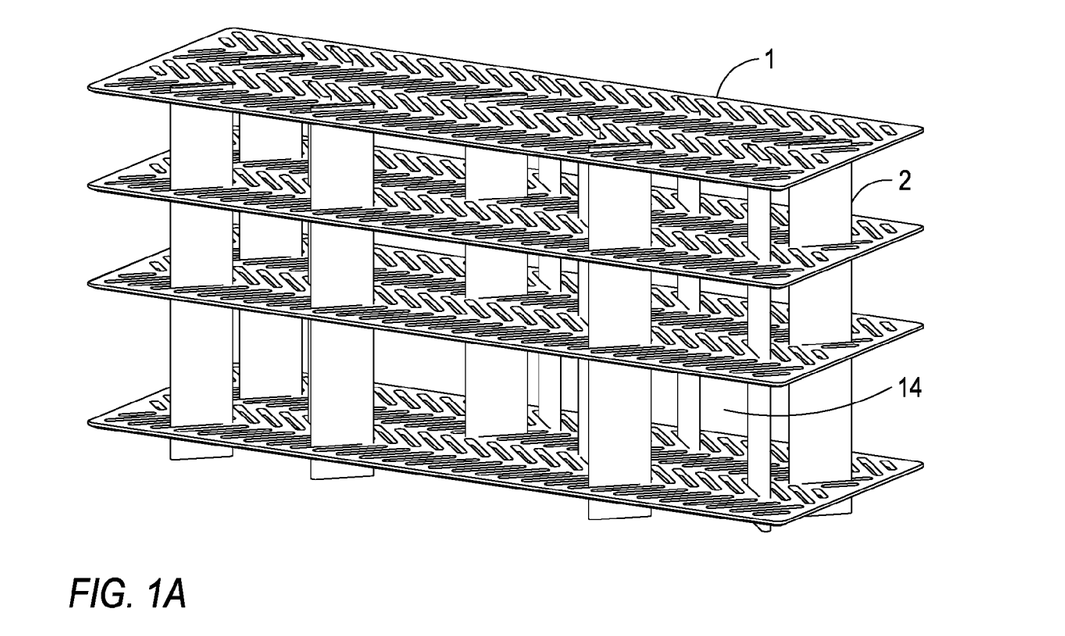
FIG. 1A shows one possible configuration of the framing system in a perspective view.

FIG. 1A shows one possible configuration of the framing system in a perspective view, consisting of four horizontal members 1 and a plurality of vertical members 2, which are arranged in a variety of possible locations and angles of orientation, as guided by the span-aligned-grid, to create one possible configuration of framed opening bays 14. The assembly may be also comprised of any number of horizontal members 1 and vertical members 2, and the vertical members may be placed to form any desired configuration of the framed opening bays 14, given the limits of the materials used.

This possible configuration shows a plurality of vertical members 2 with one possible arrangement of their number, location, and angle of orientation, creating one possible configuration of framed opening bays 14, and shows more than the minimum number of vertical members 2 required for structural stability. The number and configuration of vertical members 2 may also be engineered to determine the minimum required for structural stability, given the limits of the material used. The angles or orientation of the vertical members 2 may also be engineered to provide a desired amount of out-of-plane bi-directional lateral bracing, given the limits of the material used.

Figure 1B:
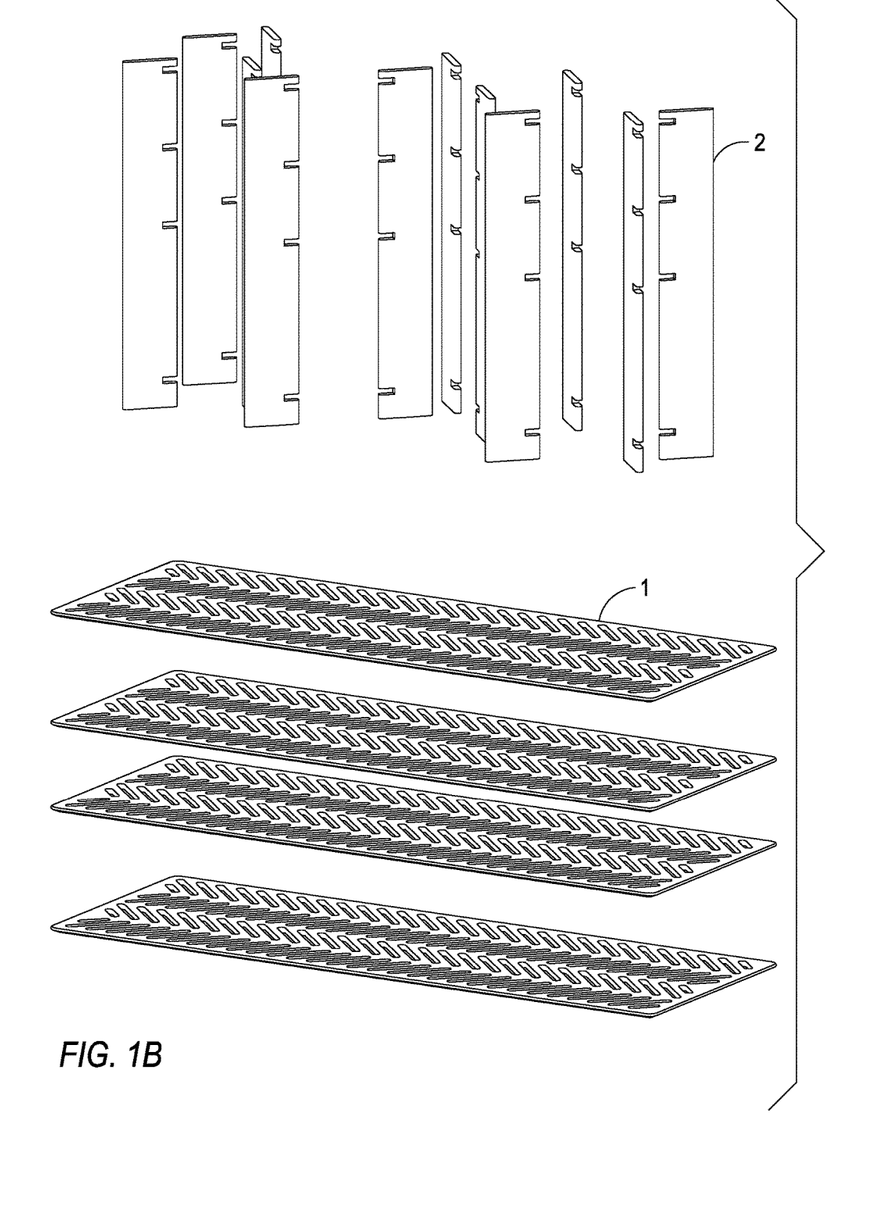
FIG. 1B shows an exploded view of the same possible configuration of FIG. 1A.

FIG. 1B shows an exploded view of the same possible configuration of FIG. 1A. For a given assembly with multiple horizontal members 1, the openings 6A (see FIG. 2A) shall be configured in span-aligned-grids with similar spacing, shapes, and angles of intersection, with the openings 6A (see FIG. 2A) aligned vertically between multiple horizontal members 1, so that the vertical members 2 can fit slidably through multiple horizontal members 1.

Figure 2A:
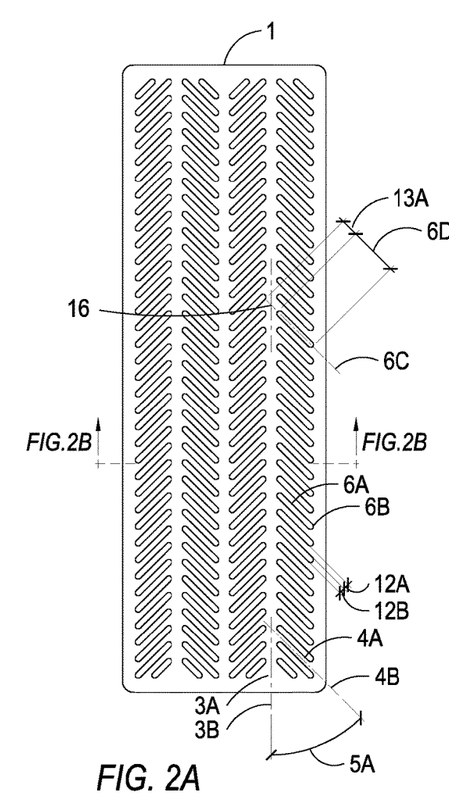
FIG. 2A shows a plan view of one possible configuration of the horizontal members with span-aligned-grid.

FIG. 2A illustrates a plan view of one possible configuration of the horizontal members 1 with span-aligned-grid. This possible configuration depicts a span-aligned-grid consisting of five primary span ribs 3A with longitudinal axis in the primary direction 3B of the three-way grid, and four bays of secondary span ribs 4A with longitudinal axis in the secondary directions 4B of the three-way grid. The span-aligned-grid may also consist of any number of primary span ribs 3A and secondary span ribs 4A, given the limits of the material used.

This possible configuration shows the span-aligned-grid organized so that the direction of the primary span longitudinal axis 3B, and the direction of the secondary span longitudinal axis 4B have an angle of intersection 5A at forty five degrees. The span-aligned-grid may also have any angle of intersection 5A, given the limits of the material used.

This possible configuration shows a rectilinear geometry of the span-aligned-grid. The span-aligned-grid may have a rectilinear geometry, may have a circular geometry, may have a radial geometry, may have a tessellated tile pattern geometry, may have a geometry that branches, or may be comprised of any combination of these possible geometries (see FIGS. 4, 5, 6A, 6B, 7A, & 8).

This possible configuration shows an equal ratio between the width 12A of the secondary span ribs 4A, and the width 12B of the openings 6A. The ratio between the width 12A of the secondary span ribs 4A and the width 12B of the openings 6A may also be any ratio, or combination or ratios given the limits of the material used.

Figure 2B:
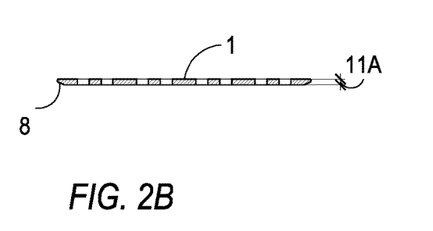
FIG. 2B shows a transverse sectional view of the same possible configuration of the horizontal members with span-aligned-grid.

FIG. 2B illustrates a transverse sectional view of the same possible configuration of the horizontal members 1 with span-aligned-grid. This possible configuration of the horizontal members 1 depicts a rounded and tapered outside edge profile 8. The outside edge profile 8 may be any shape, and may be engineered to cantilever to any distance, given the limits of the material used.

Figures 3A, 3B, 3C:
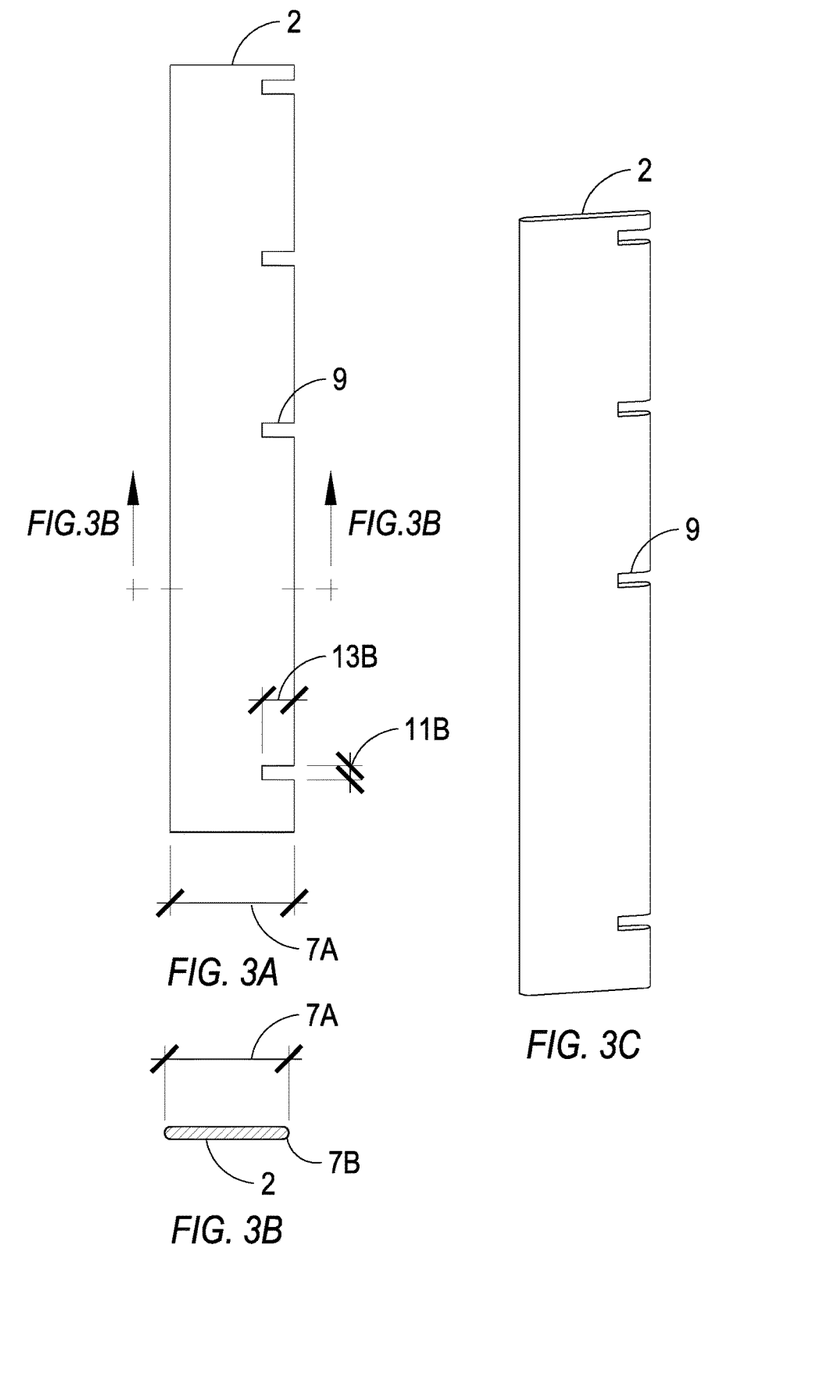
FIG. 3A shows an elevation view of one possible configuration of the vertical members.
FIG. 3B shows a cross section view of the same possible configuration of the vertical members.
FIG. 3C shows a perspective view of the same possible configuration of the vertical members.

This possible configuration shows a thickness 11A of the horizontal members 1, which corresponds to the height 11B of the slot 9 of the vertical members 2 as shown on FIG. 3A, so that when the components are interlocked they fit snuggly, and bare the weight of the assembly, and whatever additional loads they are engineered to carry.

Figure 2C:
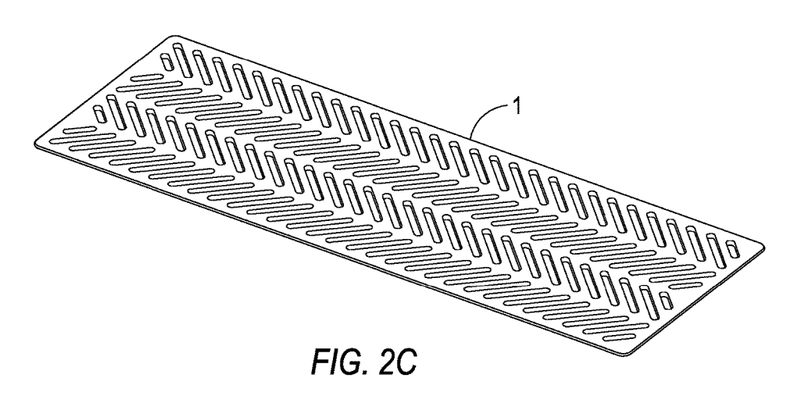
FIG. 2C shows a perspective view of the same possible configuration of the horizontal members with span-aligned-grid.

FIG. 2C depicts a perspective view of the same possible configuration of the horizontal members 1 with span-aligned-grid.

FIG. 3A illustrates an elevation view of one possible configuration of the vertical members 2. This possible configuration shows four slots 9, spaced at regular heights, utilized for interlocking with the horizontal members 1 as shown in FIG. 1B. The number and spacing of the interlocking slots 9 may also be any desired combination, corresponding to the desired number and spacing of the horizontal members 1, given the limits of the material used.

The slots 9 may be any desired length 13B, where the ratio between the width 13A of the primary span ribs 3A as shown in FIG. 2A and the length 13B of slot 9 across the angle of intersection 5A as shown in FIG. 2A, creates an overlap at variable-support-points 16 between said primary span ribs 3A and slot 9 to provide adequate bearing area for the given materials and loads of the assembly.

FIG. 3B shows a cross section view of the same possible configuration of the vertical members 2.

This possible configuration of the vertical members 2 shows a cross section with rounded edge shape 7B as shown in FIG. 3B and shows a corresponding openings 6A with rounded edge 6B as shown in FIG. 2A of the horizontal members 1. The edge of these elements may also be any shape, given the limits of the material used, provided that the cross section shape 7B as shown in FIG. 3B of the vertical members 2 corresponds to the shape 6B of the openings 6A as shown in FIG. 2A of the horizontal members 1.

This possible configuration shows a length 7A of the cross section shape 7B as shown in FIG. 3B of the vertical members 2, which corresponds to the length 6D of the longitudinal axis 6C of the openings 6A as shown in FIG. 2A of the horizontal members 1. The length 7A of the cross section shape 7B as shown in FIG. 3B of the vertical members 2 may also be any length less than the length 6D of the longitudinal axis 6C of the openings 6A as shown in FIG. 2A of the horizontal members 1, given the limits of the material used.

FIG. 3C shows a perspective view of the same possible configuration of the vertical members 2.

Figure 4:
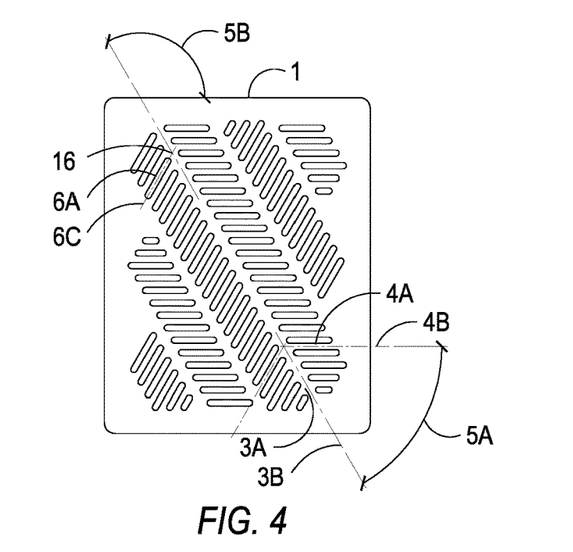
FIG. 4 shows an alternate embodiment of the horizontal members, wherein the span-aligned-grid has an orthogonal geometry where the longitudinal axis of the primary ribs are not at a right angle to the boundary of the horizontal members.

FIG. 4 shows an alternate embodiment of the horizontal members 1, wherein the span-aligned-grid has an orthogonal geometry where the longitudinal axis of the primary span ribs 3B have an angle of intersection 5B which is not at a right angle to the boundary of the horizontal members 1.

Figure 5:
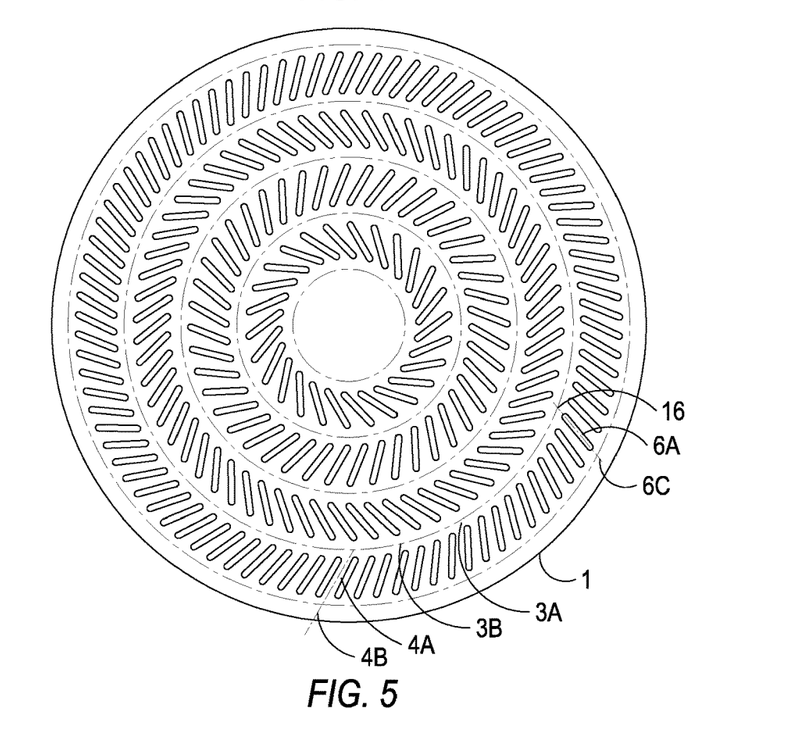
FIG. 5 shows an alternate embodiment of the horizontal members, wherein said span-aligned-grid has a circular geometry, where the longitudinal axis of the primary ribs are organized in concentric circles.

FIG. 5 shows an alternate embodiment of the horizontal members 1, wherein said span-aligned-grid has a circular geometry, where the longitudinal axis of the primary span ribs 3B are organized in concentric circles, and where the spatial relationships of the other components of the span-aligned-grid are also consistent with the circular geometry, and where the characteristics of said components may also be formed with any of the variations described herein previously within the realm of said circular geometry.

Figure 6A:
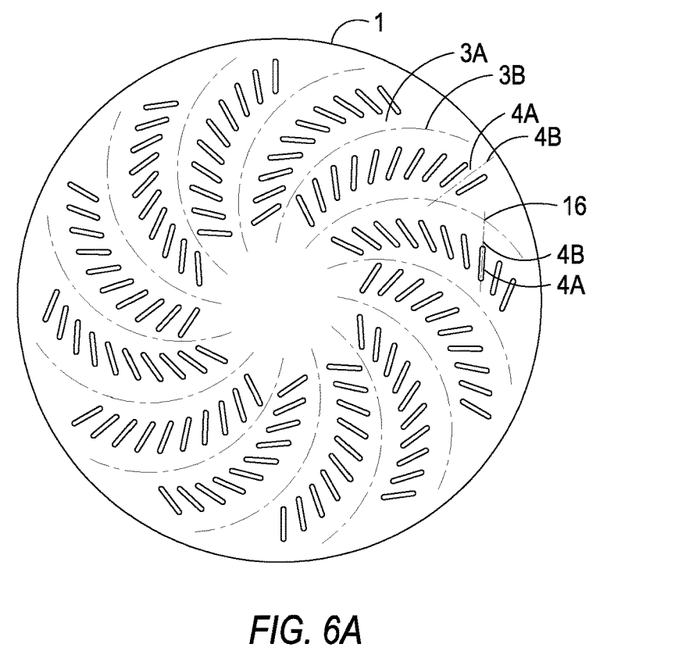
FIG. 6A shows an alternate embodiment of the horizontal members, wherein said span-aligned-grid has a radial geometry, where the longitudinal axis of the primary span ribs are organized in arcs radially from a center point.

FIG. 6A shows an alternate embodiment of the horizontal members 1, wherein said span-aligned-grid has a radial geometry, where the longitudinal axis of the primary span ribs 3B are organized in arcs radially from a center point, and where the spatial relationships of the other components of the span-aligned-grid are also consistent with the radial geometry, and where the characteristics of said components may also be formed with any of the variations described herein previously within the realm of said radial geometry.

Figure 6B:
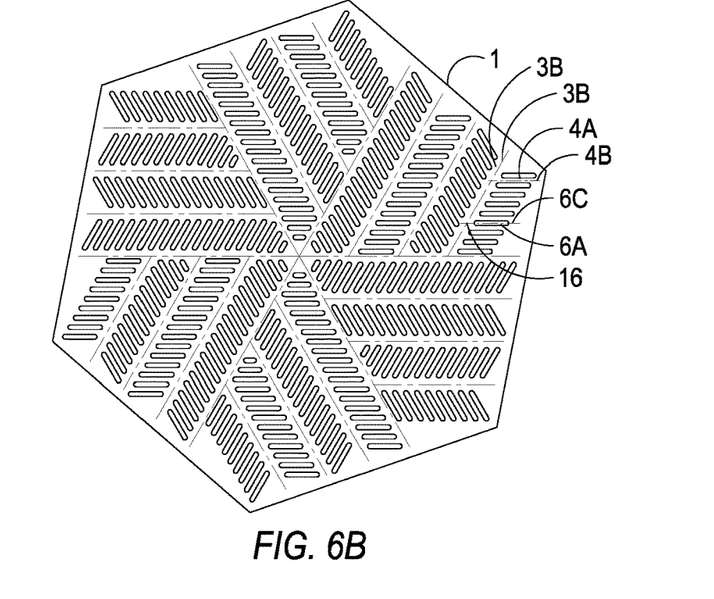
FIG. 6B shows an alternate embodiment of the horizontal members, wherein said span-aligned-grid has a radial geometry, where the longitudinal axis of the primary span ribs are organized in straight lines radially from a center point.

FIG. 6B shows an alternate embodiment of the horizontal members 1, wherein said span-aligned-grid has a radial geometry, where the longitudinal axis of the primary span ribs 3B are organized in straight lines radially from a center point, and where the spatial relationships of the other components of the span-aligned-grid are also consistent with the radial geometry, and where the characteristics of said components may also be formed with any of the variations described herein previously within the realm of said radial geometry.

Figure 7A:
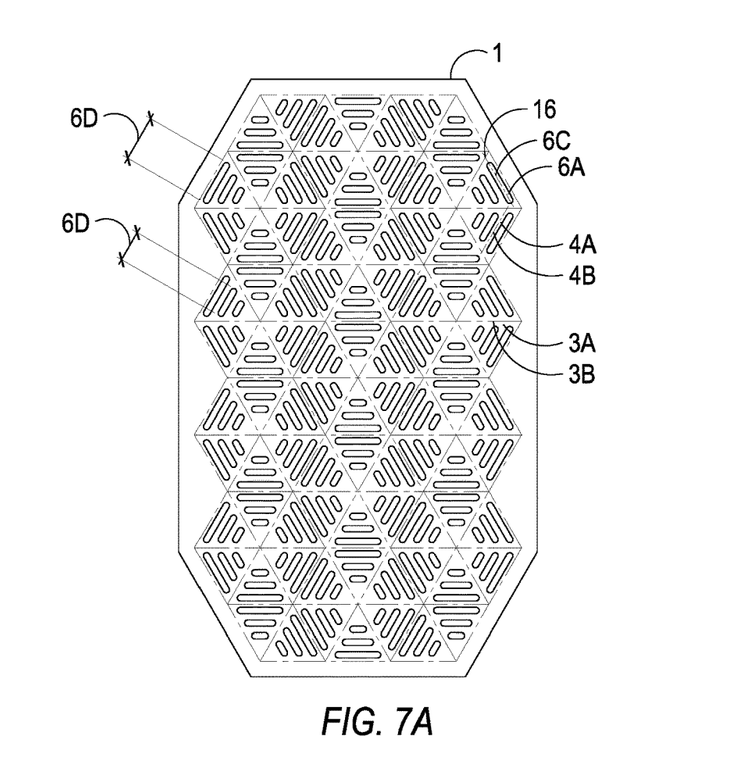
FIG. 7A shows an alternate embodiment of the horizontal members, wherein said span-aligned-grid has a tiled geometry where the configuration of primary span ribs and secondary span ribs are repeated in a translational tiled pattern.

FIG. 7A shows an alternate embodiment of the horizontal members 1, wherein said span-aligned-grid has a tiled geometry where the configuration of primary span ribs 3A and secondary span ribs 3B are repeated in a translational tiled pattern, and where the spatial relationships of the other components of the span-aligned-grid are also consistent with the tiled geometry, and where the characteristics of said components may also be formed with any of the variations described herein previously within the realm of said tiled geometry.

Figure 7B:
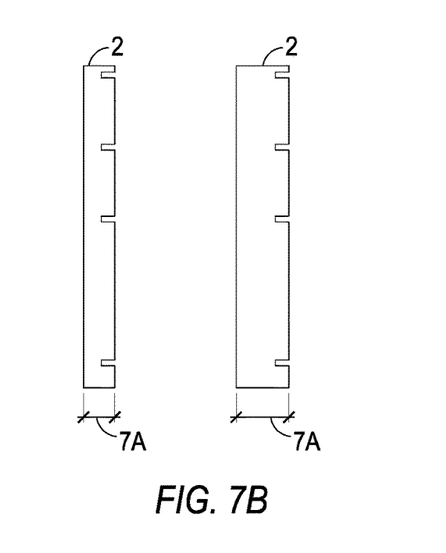
FIG. 7B shows an alternate embodiment of the vertical members, wherein the vertical members cross section has a length, and the corresponding horizontal members openings shape has a length, which may vary in multiple paired groupings within the assembly.

FIG. 7B shows an alternate embodiment of the vertical members 2, wherein the vertical members 2 cross section has a length 7A, and the corresponding horizontal members 1 openings 6A shape has a length 6D as shown in FIG. 7A, which may vary in multiple paired groupings within the assembly.

Figure 8:
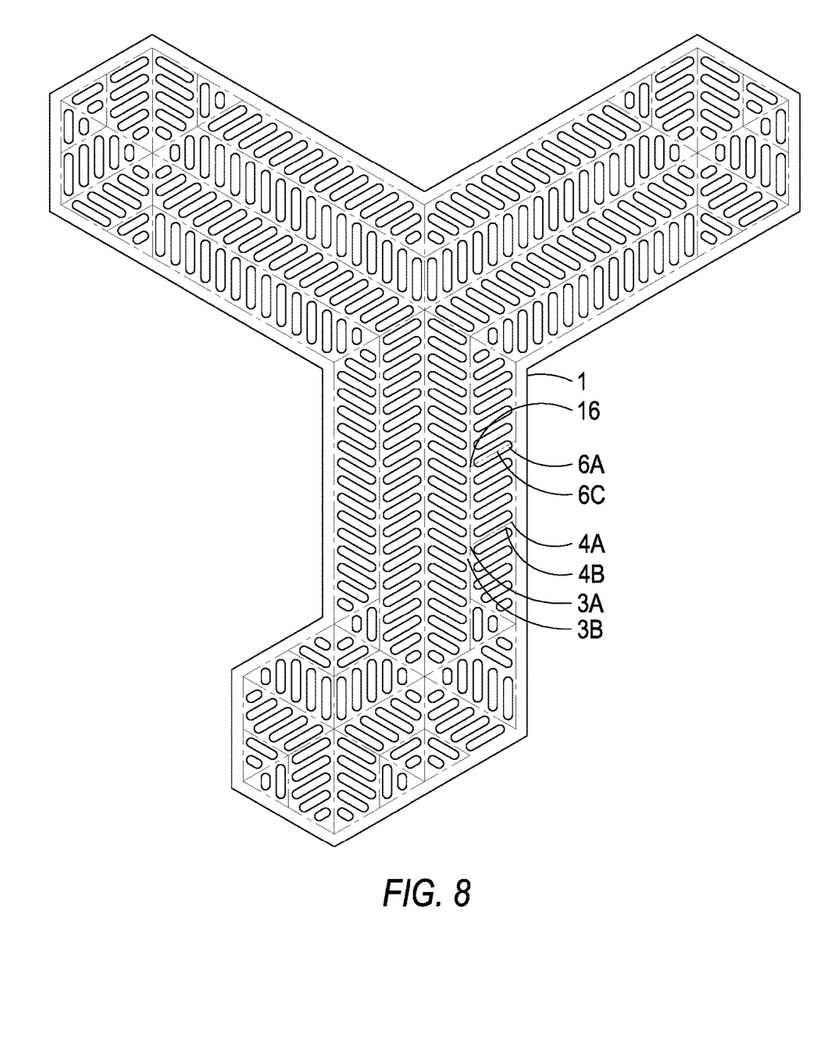
FIG. 8 shows an alternate embodiment of the horizontal members, wherein said span-aligned-grid has a branching geometry, where the longitudinal axis of the primary span ribs may branch, through multiple changing orientations of the three-way grid.

FIG. 8 shows an alternate embodiment of the horizontal members 1, wherein said span-aligned-grid has a branching geometry, where the longitudinal axis of the primary span ribs 3B may branch, through multiple changing orientations of the three-way grid, and where the spatial relationships of the other components of the span-aligned-grid are also consistent with the branching geometry, and where the characteristics of said components may also be formed with any of the variations described herein previously within the realm of said branching geometry.

The invention claimed is:
1. A framing system comprising: a plurality of horizontal members and a plurality of vertical members;
   each of the horizontal members comprising at least three rows of slanted elongated openings spaced evenly across the length of the respective horizontal member;

wherein the at least three rows of the openings comprise at least one row of primary openings and at least one row of secondary openings, the at least one row of primary openings are slanted in the same direction and the at least one row of secondary openings are slanted in a direction different from that of the primary openings, wherein the at least one row of the primary openings and the at least one row of secondary openings are arranged in an alternating manner such that a first row of the primary openings is adjacent to a first row of secondary openings and wherein a longitudinal axis of each primary openings intersects a longitudinal axis of a respective adjacent secondary opening, wherein each vertical member is planar having a thickness, an edge, a height and a cross section, wherein the cross section of each vertical member corresponds to the shape and length of the openings and the edge of each vertical member is notched with slots along the height of each of the vertical members, wherein each slot has a height that corresponds to a thickness of the horizontal members;

wherein each vertical member is configured to be slidably inserted vertically into one of the openings of each horizontal member, each slot of the respective vertical member is configured to interlock with an edge of the respective opening in the respective horizontal member so that each vertical member is interlocked with each of the horizontal members, wherein the framing system is configured to form plurality of framed opening bays between the vertical members that are interlocked with the horizontal members.

2. The framing system of claim 1, wherein the vertical members are configured to be positioned and repositioned in any one of the elongated openings of each horizontal member to form customizable configuration of the framed opening bays.

3. The framing system of claim 1, wherein the vertical members are configured to be repositioned in the elongated openings individually.

4. The framing system of claim 1, wherein the edge of the vertical members and an edge of each of the elongated openings have a rounded shape.

* * * * *